United States Patent
Hong

(10) Patent No.: US 12,053,751 B2
(45) Date of Patent: Aug. 6, 2024

(54) SYSTEM FOR DISSOLVING GAS

(71) Applicant: PURITECH Co., Ltd., Asan-si (KR)

(72) Inventor: Sung Hun Hong, Asan-si (KR)

(73) Assignee: PURITECH Co., Ltd., Asan-si (KR)

( * ) Notice: Subject to any disclaimer, the term of this patent is extended or adjusted under 35 U.S.C. 154(b) by 66 days.

(21) Appl. No.: 17/505,612

(22) Filed: Oct. 19, 2021

(65) Prior Publication Data

US 2022/0370963 A1    Nov. 24, 2022

(30) Foreign Application Priority Data

May 20, 2021    (KR) .......................... 10-2021-0064574

(51) Int. Cl.
*B01F 23/23*    (2022.01)
*B01F 23/232*    (2022.01)
(Continued)

(52) U.S. Cl.
CPC ........ *B01F 33/811* (2022.01); *B01F 23/2323* (2022.01); *B01F 25/31233* (2022.01);
(Continued)

(58) Field of Classification Search
CPC .............. B01F 23/2323; B01F 23/2373; B01F 25/31233; B01F 33/811; B01F 35/2132; B01F 35/2211
(Continued)

(56) References Cited

U.S. PATENT DOCUMENTS

2004/0251566 A1* 12/2004 Kozyuk .............. B01F 25/4335
                                                            261/76
2010/0219260 A1   9/2010 Matsuoka et al.
(Continued)

FOREIGN PATENT DOCUMENTS

CN    102417230 A    4/2012
CN    103349924 A    10/2013
(Continued)

OTHER PUBLICATIONS

Partial English Translation of JP 2010240592 (Year: 2010).*
Partial English Translation of KR 20190076819 (Year: 2019).*
Partial Translation of CN 209438397 U (Year: 2019).*

*Primary Examiner* — Charles S Bushey
(74) *Attorney, Agent, or Firm* — Park, Kim & Suh, LLC

(57) ABSTRACT

The present inventive concept relates to a system for dissolving gas. Specifically, an embodiment of the present inventive concept provides a system for dissolving gas, the system including a water supply unit configured to supply water, a gas supply unit configured to supply gas, a gas solution generation unit connected to the water supply unit and the gas supply unit, and a bubble gas solution generation unit connected to a rear end of the gas solution generation unit, wherein the gas solution generation unit includes a first gas solution generator connected in parallel to the gas supply unit and configured to generate a first gas solution and at least one second gas solution generator connected in parallel to the gas supply unit, connected in series to the first gas solution generator to receive the first gas solution from the first gas solution generator, and configured to generate a second gas solution having a gas concentration higher than a gas concentration of the first gas solution, and the bubble gas solution generation unit is connected to the second gas solution generator to receive the second gas solution from the second gas solution generator and generates a third gas solution containing a gas whose particles are smaller than particles of the gas contained in the second gas solution.

5 Claims, 3 Drawing Sheets

(51) Int. Cl.
*B01F 25/312* (2022.01)
*B01F 33/81* (2022.01)
*B01F 35/21* (2022.01)
*B01F 35/221* (2022.01)
*B01F 23/2373* (2022.01)

(52) U.S. Cl.
CPC ...... *B01F 35/2132* (2022.01); *B01F 35/2211* (2022.01); *B01F 23/2373* (2022.01)

(58) Field of Classification Search
USPC ...................................................... 261/21, 76
See application file for complete search history.

(56) References Cited

U.S. PATENT DOCUMENTS

| | | | |
|---|---|---|---|
| 2019/0201566 A1 | 7/2019 | Hollst | |
| 2019/0232238 A1* | 8/2019 | Goi | ............ A23L 2/54 |
| 2019/0275476 A1 | 9/2019 | Talamantez et al. | |

FOREIGN PATENT DOCUMENTS

| | | | |
|---|---|---|---|
| CN | 104136107 A | | 11/2014 |
| CN | 208275262 U | | 12/2018 |
| CN | 209438397 U | * | 9/2019 |
| CN | 106457167 B | | 6/2020 |
| CN | 112023736 A | | 12/2020 |
| EP | 3281690 A1 | * | 2/2018 |
| JP | H8-59207 A | | 3/1996 |
| JP | H9-173804 A | | 7/1997 |
| JP | 2005-77040 A | | 3/2005 |
| JP | 2006-297239 A | | 11/2006 |
| JP | 2009-285651 A | | 12/2009 |
| JP | 2010-75838 A | | 4/2010 |
| JP | 2010-240592 | * | 10/2010 |
| JP | 2011-88053 A | | 5/2011 |
| JP | 2011-240206 A | | 12/2011 |
| JP | WO2010/023977 A1 | | 1/2012 |
| KR | 2003-0012925 A | | 2/2003 |
| KR | 10-0935217 B1 | | 1/2010 |
| KR | 10-0973491 B1 | | 8/2010 |
| KR | 10-1213829 B1 | | 12/2012 |
| KR | 10-2014-0110866 A | | 9/2014 |
| KR | 10-2015-0028504 A | | 3/2015 |
| KR | 10-2019-0076819 | * | 7/2019 |
| WO | 02/085790 A2 | | 10/2002 |

* cited by examiner

SYSTEM FOR DISSOLVING GAS

CROSS-REFERENCE TO RELATED APPLICATION

This application claims priority to Korean Patent Application No. 2021-0065574 filed on May 20, 2021 in the Korean Intellectual Property Office (KIPO), the entire contents of which are hereby incorporated by reference.

BACKGROUND

1. Technical Field

Example embodiments of the present disclosure relate to a system for dissolving gas.

2. Related Art

In general, microbubbles refer to bubbles with a particle size that is much smaller than the particle size of ordinary bubbles, and such microbubbles are generated when both water and gas are present. In this case, the microbubbles have properties that ordinary bubbles do not have. For example, while bubbles with an ordinary particle size rise quickly and burst upon reaching the water surface, the microbubbles rise slowly as if floating in water due to being less buoyant than the ordinary bubbles. This phenomenon occurs because the smaller the bubbles, the higher the resistance to buoyancy. Bubbles rising more slowly means that the bubbles can stay longer in water.

In this case, while the microbubbles stay in water, gas in the microbubbles gradually dissolves in the surrounding water, and the smaller the bubbles, the higher the ratio of the surface area to volume of air in the bubbles. From this, it can be seen that the microbubbles, in which the volume of each bubble is smaller and the sum of surface areas of the bubbles is greater as compared to ordinary bubbles, are more efficient than the ordinary bubbles when dissolving the same amount of gas in water.

Meanwhile, since the microbubbles are ultrafine bubbles with a diameter of 50 µm or less, during the process of floating in water, the microbubbles naturally contract to nano-size and eventually disappear as gas therein completely dissolves in water. Due to having characteristics such as electrification or self-pressurization, the microbubbles have great potential for application across all industries.

The microbubbles may be generated through a conventional system for dissolving gas. For example, the conventional system for dissolving gas may generate microbubbles mainly by using a method in which a gas such as oxygen, carbon dioxide, and ozone is mixed with a fluid such as water under a predetermined pressure to mix at least a portion of the gas with the liquid and then pressure of a gas solution, in which at least a portion of the gas is dissolved, is released.

However, in this case, since it is difficult to minimize a particle size of the gas being added to the water, there is a problem in that it is not easy to control the speed at which the gas added to the water rises. Accordingly, an amount of time during which the water and gas come into contact with each other is not sufficiently secured, and thus there is a problem in that a limitation exists in improving solubility of gas in water.

Also, when a large amount of gas is added to water to improve the solubility of gas in water, there is a problem in that economic feasibility is degraded due to an increase in operational costs and the like.

SUMMARY

Accordingly, example embodiments of the present inventive concept are provided to substantially obviate one or more problems due to limitations and disadvantages of the related art.

Example embodiments of the present inventive concept provide a system for dissolving gas that is capable of improving solubility of gas in water in multiple stages to generate a gas solution and efficiently generating microbubbles through the generated gas solution, thus securing economic feasibility.

In some example embodiments, a system for dissolving gas includes a water supply unit configured to supply water, a gas supply unit configured to supply gas, a gas solution generation unit connected to the water supply unit and the gas supply unit, and a bubble gas solution generation unit connected to a rear end of the gas solution generation unit, wherein the gas solution generation unit includes a first gas solution generator connected in parallel to the gas supply unit and configured to generate a first gas solution and at least one second gas solution generator connected in parallel to the gas supply unit, connected in series to the first gas solution generator to receive the first gas solution from the first gas solution generator, and configured to generate a second gas solution having a gas concentration higher than a gas concentration of the first gas solution, and the bubble gas solution generation unit is connected to the second gas solution generator to receive the second gas solution from the second gas solution generator and generates a third gas solution containing a gas whose particles are smaller than particles of the gas contained in the second gas solution.

Also, the first gas solution generator may include a first gas discharge device connected to a rear end of the gas supply unit to receive the gas from the gas supply unit and configured to discharge the gas to generate a discharge gas, a first venturi device connected to a rear end of the first gas discharge device to receive the discharge gas from the first gas discharge device and configured to dissolve at least a portion of the discharge gas in the water supplied from the water supply unit to generate the first gas solution, and a first reflux prevention device disposed between the first gas discharge device and the first venturi device.

Also, the second gas solution generator may include a second gas discharge device connected to a rear end of the gas supply unit to receive the gas from the gas supply unit and configured to discharge the gas to generate a discharge gas, a second venturi device connected to a rear end of the second gas discharge device, and a second reflux prevention device disposed between the second gas discharge device and the second venturi device, and the second venturi device may receive the discharge gas from the second gas discharge device, may be connected in series to the first venturi device of the first gas solution generator to receive the first gas solution from the first venturi device, and may dissolve at least a portion of the discharge gas in the first gas solution to generate the second gas solution.

Also, the system may further include a recovery unit connected to the gas solution generation unit, and the recovery unit may recover at least one of a first residual discharge gas which is a portion of the discharge gas supplied to the first venturi device of the first gas solution generator that remains undissolved in the water and a second residual discharge gas which is a portion of the discharge gas supplied to the second venturi device of the second gas solution generator that remains undissolved in the water.

Also, the system may further include a control unit configured to control at least one of the water supply unit, the gas supply unit, the gas solution generation unit, and the bubble gas solution generation unit.

Also, the first gas solution generator may further include a first measuring member electrically connected to the first venturi device to measure a gas concentration of the first gas solution generated in the first venturi device, and the control unit may control operation of the first gas discharge device on the basis of a value measured by the first measuring member.

Also, the second gas solution generator may further include a second measuring member electrically connected to the second venturi device to measure a gas concentration of the second gas solution generated in the second venturi device, and the control unit may control operation of the second gas discharge device on the basis of a value measured by the second measuring member.

BRIEF DESCRIPTION OF DRAWINGS

Example embodiments of the present inventive concept will become more apparent by describing example embodiments of the present inventive concept in detail with reference to the accompanying drawings, in which.

DESCRIPTION OF EXAMPLE EMBODIMENTS

Hereinafter, specific embodiments for implementing the spirit of the present inventive concept will be described in detail with reference to the accompanying drawings.

Further, in describing the present inventive concept, when detailed description of a known configuration or function related to the present inventive concept is determined as having the possibility of obscuring the gist of the present inventive concept, the detailed description thereof will be omitted.

Also, when a certain element is described as being "connected" or "coupled" to another element, it should be understood that the element may be directly connected or coupled to the other element, but another element may also be present therebetween.

Terms used herein are for describing specific embodiments and are not intended to limit the present inventive concept. A singular expression includes a plural expression unless the context clearly indicates otherwise.

Also, note that expressions such as "one side" and "the other side" used herein are based on the drawings and may be changed when a direction of the corresponding object is changed. Likewise, some elements in the accompanying drawings may have been exaggerated, omitted, or schematically illustrated, and the size of each element does not necessarily reflect the actual size.

Also, terms including ordinals such as first and second may be used to describe various elements, but the corresponding elements are not limited by such terms. The terms are only used to distinguish one element from another.

The terms "comprises", "comprising", "includes", and/or "including", when used herein, specify the presence of stated features, areas, integers, steps, operations, elements, and/or components but do not preclude the presence or addition of one or more other features, areas, integers, steps, operations, elements, components, and/or groups thereof.

Hereinafter, a specific configuration of a system for dissolving gas according to an embodiment of the present inventive concept will be described with reference to the accompanying drawings.

Figure 1:
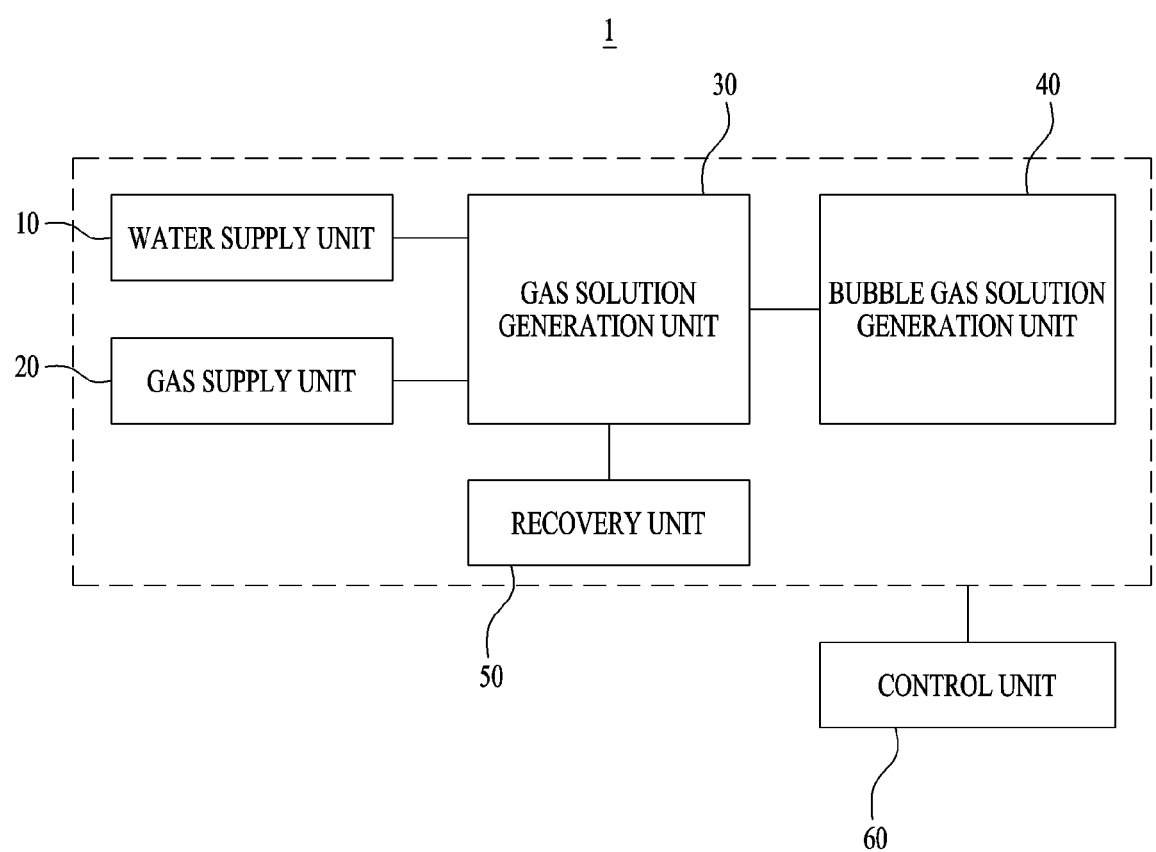
FIG. 1 is a block diagram illustrating a system for dissolving gas according to an embodiment of the present inventive concept.
Figure 2:
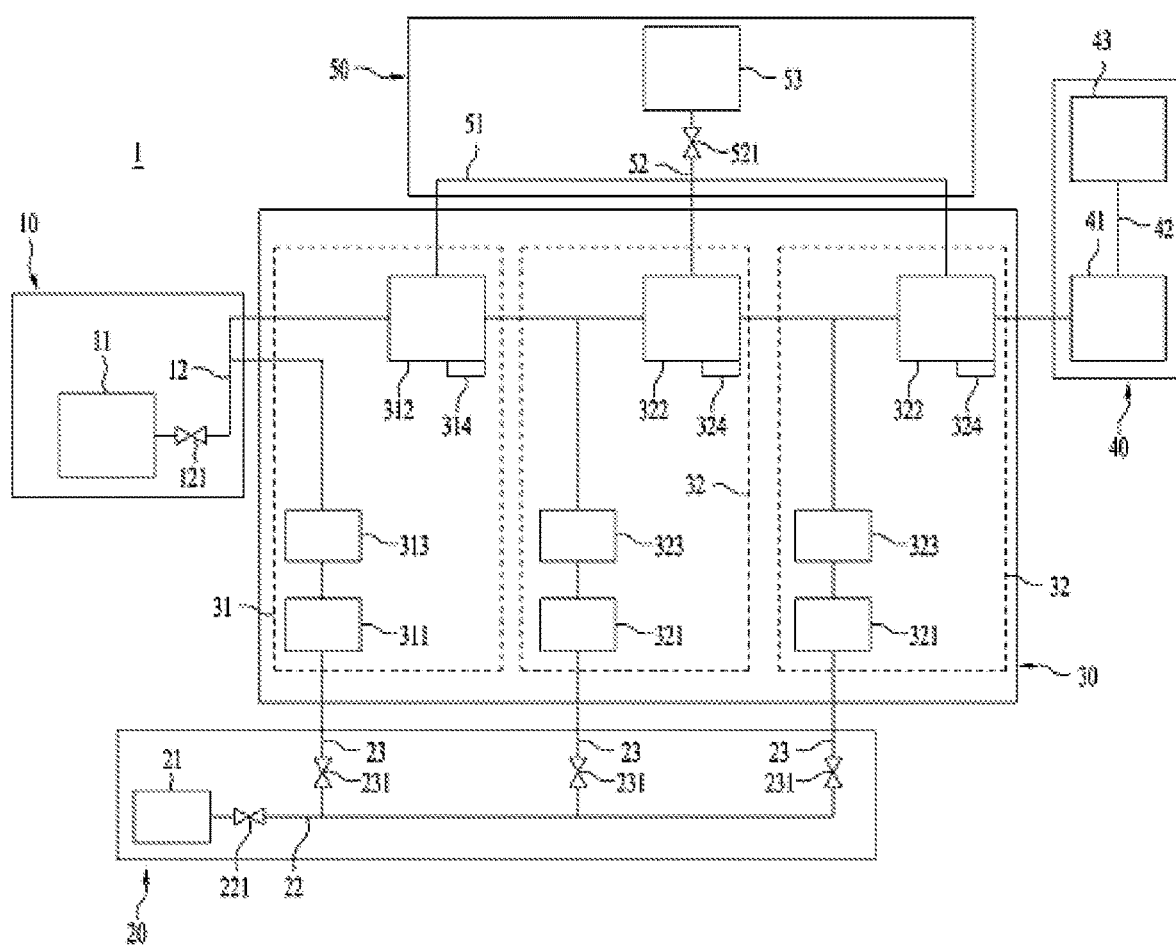
FIG. 2 is a process diagram briefly illustrating the system of FIG. 1.
Figure 3:
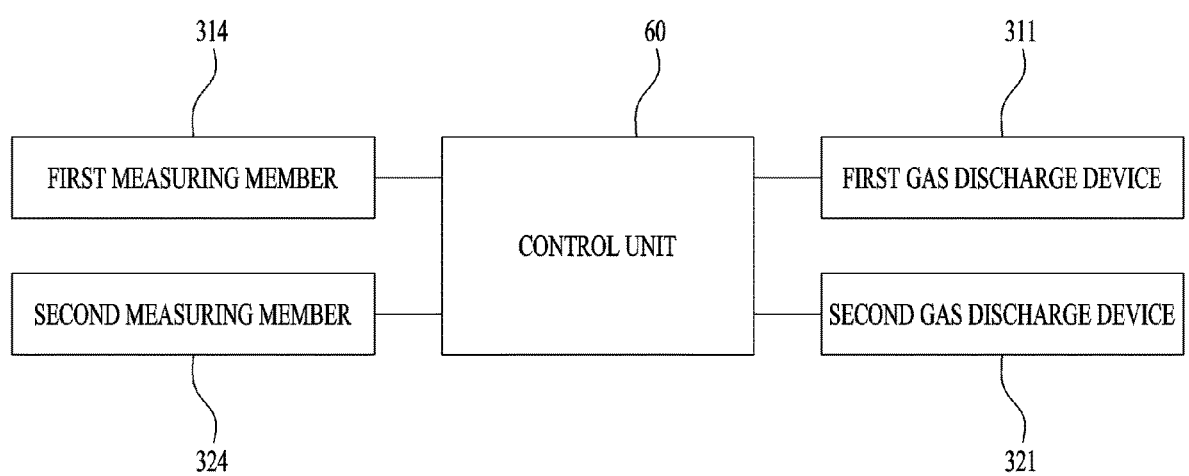
FIG. 3 is a control block diagram of the system of FIG. 1.

Referring to FIGS. 1 to 3, a gas dissolving system 1 according to an embodiment of the present inventive concept may include a water supply unit 10, a gas supply unit 20, a gas solution generation unit 30, a bubble gas solution generation unit 40, a recovery unit 50, and a control unit 60.

The water supply unit 10 may supply water to the gas solution generation unit 30. To this end, the water supply unit 10 may include a water storage tank 11 in which water is stored and a water supply line 12 connected between the water storage tank 11 and the gas solution generation unit 30.

In this case, a water supply valve 121 may be installed in the water supply line 12. The opening and closing of the water supply valve 121 may be controlled according to a pressure value measured by a pressure meter connected to a first gas solution generator 31 and a second gas solution generator 32 of the gas solution generation unit 30 which will be described below.

Meanwhile, a second gas supply line 23 of the gas supply unit 20, which will be described below, may be connected to at least a portion of the water supply line 12. Accordingly, with respect to a connection point where the second gas supply line 23 is connected to the water supply line 12, water may flow in a portion of the water supply line 12 that corresponds to a front end of the connection point. Also, in a portion of the water supply line 12 that corresponds to a rear end of the connection point, water may flow or water mixed with a discharge gas supplied from a first gas discharge device 311 of the first gas solution generator 31 of the gas solution generation unit 30, which will be described below, may flow.

The gas supply unit 20 may supply gas to the gas solution generation unit 30. To this end, the gas supply unit 20 may include a gas storage tank 21 in which at least one of oxygen, carbon dioxide, ozone, and nitrogen in a gaseous state is stored, a first gas supply line 22 connected to the gas storage tank 21, and at least one second gas supply line 23 connected in parallel to the first gas supply line 22.

In this case, a first gas supply valve 221 may be installed in the first gas supply line 22, and a pressure meter may be installed at a front end of the first gas supply valve 221. A pressure value of the first gas supply line 22 measured by the pressure meter may be used in controlling the opening and closing of the first gas supply valve 221.

A flowmeter may be installed in the second gas supply line 23, and a flow value of gas flowing along the second gas supply line 23 may be measured by the flowmeter. In this case, the water supply line 12 of the water supply unit 10 may be connected to an end portion of the second gas supply line 23.

Meanwhile, with respect to a connection point where the water supply line 12 is connected to the second gas supply line 23, a second gas supply valve 231 may be installed at a front end of the connection point. According to the opening and closing of the second gas supply valve 231, in a portion of the water supply line 12 that corresponds to a rear end of the connection point, water may flow or water mixed with a discharge gas supplied from the first gas discharge device 311 of the first gas solution generator 31 of the gas solution generation unit 30, which will be described below, may flow. For example, when a pressure value measured by the pressure meter connected to the first gas solution generator 31 and the second gas solution generator 32 of the gas solution generation unit 30 which will be described below is less than a predetermined value, the control unit 60 may close the second gas supply valve 231, and when the pressure value exceeds the predetermined value, the control unit 60 may open the second gas supply valve 231 so that a discharge gas generated from the first gas discharge device 311 of the first gas solution generator 31 and a second gas discharge device 321 of the second gas solution generator 32, which will be described below, is supplied to the first gas solution generator 31 and the second gas solution generator 32.

The gas solution generation unit 30 may improve solubility of the discharge gas in water in multiple stages to generate a gas solution. Here, "gas solution" refers to water in which gas is dissolved and which contains gas bubbles.

To this end, the gas solution generation unit 30 may include the first gas solution generator 31 which is connected in parallel to the gas supply unit 20 and configured to generate a first gas solution and at least one second gas solution generator 32 which is connected in parallel to the gas supply unit 20, connected in series to the first gas solution generator 31 to receive the first gas solution from the first gas solution generator 31, and configured to generate a second gas solution having a gas concentration higher than a gas concentration of the first gas solution.

The first gas solution generator 31 may include the first gas discharge device 311 connected to a rear end of the gas supply unit 20 to receive the gas from the gas supply unit 20 and configured to discharge the gas to generate a discharge gas, a first venturi device 312 connected to a rear end of the first gas discharge device 311 to receive the discharge gas from the first gas discharge device 311 and configured to dissolve at least a portion of the discharge gas in the water supplied from the water supply unit 10 to generate the first gas solution, a first reflux prevention device 313 disposed between the first gas discharge device 311 and the first venturi device 312, and a first measuring member 314 electrically connected to the first venturi device 312 to measure a gas concentration of the first gas solution generated in the first venturi device 312.

The first gas discharge device 311 may apply a predetermined current to the gas supplied from the gas supply unit 20 to generate the discharge gas. For example, the first gas discharge device 311 may be provided as an arc discharge device. However, this is only an example for convenience of description, and the spirit of the present inventive concept is not limited thereby.

The first venturi device 312 may dissolve at least a portion of the discharge gas supplied from the first gas discharge device 311 in the water supplied from the water supply unit 10 to generate the first gas solution.

The first reflux prevention device 313 may prevent reflex of water supplied from the water supply unit 10 to the first venturi device 312. For example, the first reflux prevention device 313 may be provided as a water trap device, and not only the water flowing backwards from the first venturi device 312, but also moisture contained in the gas supplied from the gas supply unit 20 may be trapped in the first reflux prevention device 313. The water trapped in the first reflux prevention device 313 may be recovered to the water supply unit 10 through a separate conveyor line and resupplied to the gas solution generation unit 30.

The first measuring member 314 may measure the gas concentration of the first gas solution generated in the first venturi device 312. The measured gas concentration value may be sent to the control unit 60. Here, the gas concentration value of the first gas solution refers to a value indicating a degree to which the discharge gas is dissolved in the water. When the gas concentration value of the first gas solution that is sent from the first measuring member 314 is less than a predetermined value, the control unit 60 operates the first gas discharge device 311 to generate the discharge gas and opens the second gas supply valve 231 to supply the discharge gas to the first venturi device 312. Conversely, when the gas concentration value of the first gas solution that is sent from the first measuring member 314 exceeds the predetermined value, since this indicates that the discharge gas is sufficiently dissolved in the water, the control unit 60 may stop operation of the first gas discharge device 311.

The second gas solution generator 32 may supply the discharge gas in multiple stages to the first gas solution supplied from the first gas solution generator 31 to improve solubility of the first gas solution in multiple stages. Through this process, the second gas solution generator 32 may generate the second gas solution having a gas concentration higher than the gas concentration of the first gas solution.

Specifically, the second gas solution generator 32 may include the second gas discharge device 321 connected to the rear end of the gas supply unit 20 to receive the gas from the gas supply unit 20 and configured to discharge the gas to generate a discharge gas, a second venturi device 322 connected to a rear end of the second gas discharge device 321, a second reflux prevention device 323 disposed between the second gas discharge device 321 and the second venturi device 322, and a second measuring member 324 electrically connected to the second venturi device 322 to measure a gas concentration of the second gas solution generated in the second venturi device 322.

The second gas discharge device 321 may apply a predetermined current to the gas supplied from the gas supply unit 20 to generate the discharge gas. For example, the second gas discharge device 321 may be provided as an arc discharge device. However, this is only an example for convenience of description, and the spirit of the present inventive concept is not limited thereby.

The second venturi device 322 may receive the discharge gas from the second gas discharge device 321 and may be connected in series to the first venturi device 312 of the first gas solution generator 31. Accordingly, the second venturi device 322 may receive the first gas solution from the first venturi device 312 and may dissolve at least a portion of the discharge gas in the first gas solution supplied from the first venturi device 312 to generate the second gas solution.

The second reflux prevention device 323 may prevent reflex of water supplied from the water supply unit 10 to the second venturi device 322. For example, the second reflux prevention device 323 may be provided as a water trap device, and not only the water flowing backwards from the second venturi device 322, but also moisture contained in the gas supplied from the gas supply unit 20 may be trapped in the second reflux prevention device 323. The water trapped in the second reflux prevention device 323 may be recovered to the water supply unit 10 through a separate conveyor line and resupplied to the gas solution generation unit 30.

The second measuring member 324 may measure the gas concentration of the second gas solution generated in the second venturi device 322. In this case, the measured gas concentration value may be sent to the control unit 60. Here, the gas concentration value of the second gas solution refers to a value indicating a degree to which the discharge gas is dissolved in the water. When the gas concentration value of the second gas solution that is sent from the second measuring member 324 is less than a predetermined value, the control unit 60 operates the second gas discharge device 321 to generate the discharge gas and opens the second gas supply valve 231 to supply the discharge gas to the second venturi device 322. Conversely, when the gas concentration value of the second gas solution that is sent from the second measuring member 324 exceeds the predetermined value, since this indicates that the discharge gas is sufficiently dissolved in the water, the control unit 60 may stop operation of the second gas discharge device 321.

The bubble gas solution generation unit 40 may further improve solubility of a gas solution, e.g., the second gas solution, to generate a bubble gas solution. Here, "bubble gas solution" refers to water in which gas is dissolved and which contains gas microbubbles.

To this end, the bubble gas solution generation unit 40 may include a bubble gas solution generation device 41 connected to the second gas solution generator 32 of the gas solution generation unit 30, a bubble gas solution conveyor line 42 connected to the bubble gas solution generation device 41, and a bubble gas solution storage tank 43 connected to the bubble gas solution conveyor line 42.

The bubble gas solution generation device 41 may receive the second gas solution from the second gas solution generator 32 and may generate a third gas solution containing a gas whose particles are smaller than particles of the gas contained in the second gas solution.

The recovery unit 50 may recover at least one of a first residual discharge gas which is a portion of the discharge gas supplied to the first venturi device 312 of the first gas solution generator 31 that remains undissolved in the water and a second residual discharge gas which is a portion of the discharge gas supplied to the second venturi device 322 of the second gas solution generator 32 that remains undissolved in the water.

To this end, the recovery unit 50 may include a first recovery line 51 connected to each of the first venturi device 312 of the first gas solution generator 31 and the second venturi device 322 of the second gas solution generator 32, a second recovery line 52 connected to the first recovery line 51, and a residual discharge gas storage tank 53 connected to the second recovery line 52 and configured to store at least one of the first residual discharge gas and the second residual discharge gas.

In this case, a recovery valve 521 may be installed in the second recovery line 52. The opening and closing of the recovery valve 521 may be performed on the basis of a pressure value measured by the pressure meter connected to the first gas solution generator 31 and the second gas solution generator 32. For example, when the pressure value measured by the pressure meter connected to the first gas solution generator 31 and the second gas solution generator 32 is less than a predetermined value, the control unit 60 may close the recovery valve 521, and when the pressure value exceeds the predetermined value, the control unit 60 may open the recovery valve 521 so that at least one of the first residual discharge gas, which is a portion of the discharge gas supplied to the first venturi device 312 of the first gas solution generator 31 that remains undissolved in the water, and the second residual discharge gas, which is a portion of the discharge gas supplied to the second venturi device 322 of the second gas solution generator 32 that remains undissolved in the water, is supplied to the residual discharge gas storage tank 53.

The control unit 60 may control at least one of the water supply unit 10, the gas supply unit 20, the gas solution generation unit 30, the bubble gas solution generation unit 40, and the recovery unit 50. For example, the control unit 60 may refer to the entire control room or may encompass electronic calculation devices such as a computer and a workstation that are installed inside the control room and are capable of performing numerical calculation and analysis control, control programs embedded in the calculation devices, and communication devices capable of transmitting and receiving external data signals.

The gas dissolving system 1 having the above-described configuration may secure economic feasibility by improving solubility of gas in water in multiple stages to generate a gas solution and efficiently generating microbubbles through the generated gas solution.

A system for dissolving gas according to embodiments of the present inventive concept can improve solubility of gas in water in multiple stages to generate a gas solution and can efficiently generate microbubbles through the generated gas solution, thus securing economic feasibility.

Specific embodiments of the present inventive concept have been described above, but the embodiments are only examples, and the present inventive concept is not limited thereto and should be construed as having the broadest possible range according to the basic spirit disclosed herein. Those of ordinary skill in the art may combine/substitute the embodiments disclosed herein and carry out the embodiments in patterns not stated herein, but such patterns also belong to the scope of the present inventive concept. In addition, those of ordinary skill in the art may easily change or modify the disclosed embodiments on the basis of the present specification, and it is apparent that such changes or modifications also fall within the scope of the present inventive concept.

What is claimed is:

1. A system for dissolving gas, the system comprising:
a water supply unit configured to supply water;
a gas supply unit configured to supply gas;
a gas solution generation unit connected to the water supply unit and the gas supply unit; and
a bubble gas solution generation unit connected to a rear end of the gas solution generation unit,
wherein the gas solution generation unit includes a first gas solution generator connected to the gas supply unit and configured to generate a first gas solution and at least one second gas solution generator connected directly to the gas supply unit, and connected to an outlet end of the first gas solution generator to receive the first gas solution from the first gas solution generator, the at least one second gas solution generator being configured to generate a second gas solution having a gas concentration higher than a gas concentration of the first gas solution,
wherein the bubble gas solution generation unit is connected to the second gas solution generator to receive the second gas solution from the second gas solution generator and generates a third gas solution containing a gas whose particles are smaller than particles of the gas contained in the second gas solution,
wherein the first gas solution generator includes:
a first arc discharge device connected to a rear end of the gas supply unit to receive the gas from the gas supply unit and configured to discharge the gas to generate a discharge gas;
a first venturi device connected to a rear end of the first arc discharge device to receive the discharge gas from the first arc discharge device and configured to dissolve at least a portion of the discharge gas from the first arc discharge device into the water supplied from the water supply unit to generate the first gas solution; and
a first reflux prevention device disposed between the first arc discharge device and the first venturi device,
wherein the second gas solution generator includes:
a second arc discharge device connected to a rear end of the gas supply unit to receive the gas from the gas supply unit and configured to discharge the gas to generate a discharge gas;
a second venturi device connected to a rear end of the second arc discharge device; and
a second reflux prevention device disposed between the second arc discharge device and the second venturi device, wherein the second venturi device receives the discharge gas from the second arc discharge device, is connected to the first venturi device of the first gas solution generator to receive the first gas solution from the first venturi device, and dissolves at least a portion of the discharge gas from the second arc discharge device into the first gas solution to generate the second gas solution,
wherein the gas supply unit comprises:
a first gas supply valve connected the first gas solution generator; and
a second gas supply valve connected to the second gas solution generator
wherein the system further comprises:
a pressure meter connected to the first gas solution generator and the second gas solution generator; and
a control unit configured to close the first and second gas supply valves when a pressure value measured by the pressure meter is less than a predetermined value, and to open the first and second gas supply valves when the pressure value exceeds the predetermined value.

2. The system of claim 1, further comprising a recovery unit connected to the gas solution generation unit,
wherein the recovery unit recovers at least one of a first residual discharge gas which is a portion of the discharge gas supplied to the first venturi device of the first gas solution generator that remains undissolved in the water and a second residual discharge gas which is a portion of the discharge gas supplied to the second venturi device of the second gas solution generator that remains undissolved in the water.

3. The system of claim 2, wherein the control unit is configured to control at least one of the water supply unit, the gas supply unit, the gas solution generation unit, and the bubble gas solution generation unit.

4. The system of claim 3, wherein the first gas solution generator further includes a first measuring member electrically connected to the first venturi device to measure a gas concentration of the first gas solution generated in the first venturi device, and
wherein the control unit controls operation of the first arc discharge device on the basis of a value measured by the first measuring member.

5. The system of claim 3, wherein the second gas solution generator further includes a second measuring member electrically connected to the second venturi device to measure a gas concentration of the second gas solution generated in the second venturi device, and
wherein the control unit controls operation of the second arc discharge device on the basis of a value measured by the second measuring member.

* * * * *